United States Patent [19]
Lin

[11] Patent Number: 5,327,799
[45] Date of Patent: Jul. 12, 1994

[54] COVER FOR A STEERING WHEEL OF AN AUTOMOBILE

[76] Inventor: Ming-Ching Lin, No. 78, An-Hsi Rd., Kaohsiung City, Taiwan

[21] Appl. No.: 24,372

[22] Filed: Mar. 1, 1993

[51] Int. Cl.⁵ .............................................. B62D 1/06
[52] U.S. Cl. ................................. 74/558; 74/558.5
[58] Field of Search ................ 74/551.9, 552, 558, 74/558.5

[56] References Cited

U.S. PATENT DOCUMENTS

| | | |
|---|---|---|
| 2,226,866 | 12/1940 | Lipschultz .......................... 74/558 |
| 2,491,803 | 12/1949 | De Heras et al. .................. 74/558 |
| 2,618,987 | 11/1952 | Goldstine ........................... 74/558 |
| 3,489,031 | 1/1970 | Meier .................................. 74/558 |
| 5,213,007 | 5/1993 | Yoo ..................................... 74/558 |
| 5,224,397 | 7/1993 | Yoo ..................................... 74/558 |

Primary Examiner—Vinh T. Luong
Attorney, Agent, or Firm—Cushman, Darby & Cushman

[57] ABSTRACT

A cover for a steering wheel of an automobile includes a tire-shaped cover body disposed around the steering wheel of the automobile, and a plurality of rounded protrusions protruding uniformly from the peripheral surface thereof.

3 Claims, 4 Drawing Sheets

1

COVER FOR A STEERING WHEEL OF AN AUTOMOBILE

BACKGROUND OF THE INVENTION

1. Field of the Invention

This invention relates to a cover for a steering wheel of an automobile, more particularly to a cover having a plurality of rounded protrusions protruding uniformly from the peripheral surface of the cover.

2. Description Of The Related Art

Presently, there are many types of covers available in the market for a steering wheel of an automobile. However, all of the conventional covers cannot prevent effectively the hand from sliding thereon.

SUMMARY OF THE INVENTION

Therefore, the main object of this invention is to provide a cover for a steering wheel of an automobile. The cover has a plurality of rounded protrusions protruding uniformly from the peripheral surface thereof so as to prevent the hand from sliding thereon.

According to this invention, a cover for a steering wheel of an automobile includes a tire-shaped cover body disposed around the steering wheel of the automobile, and a plurality of rounded protrusions protruding uniformly from the peripheral surface thereof.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENT

Figure 1:
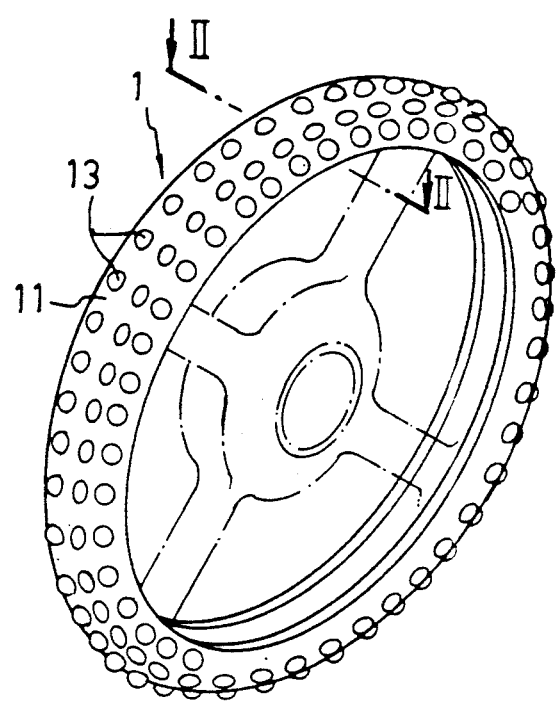
FIG. 1 is a perspective view of a cover for a steering wheel of an automobile according to a first embodiment of this invention.
Figure 2:
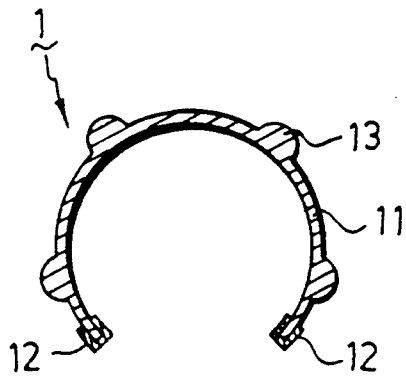
FIG. 2 is a sectional view taken along line II—II in FIG. 1.

Referring to FIGS. 1 and 2, a cover (1) for a steering wheel of an automobile according to this invention includes a tire-shape cover body (11), two engaging rings (12) and a plurality of rounded protrusions (13).

The tire-shaped cover body (11) is made of synthetic leather and is disposed around the steering wheel (shown by phantom lines in FIG. 1) of the automobile (not shown).

Each of the engaging rings (12) is substantially U-shaped in cross-section (see FIG. 2). An annular groove (see FIG. 2) is formed in the outer peripheral wall of each ring (12) so as to engage the rim of the cover body (11). The rings (12) are sewn on the rims of the cover body (11) so as to prevent the rim of the cover body (11) from damage.

The rounded protrusions (13) protrude uniformly from the peripheral surface of the cover body (11) so as to prevent the hand from sliding thereon. Moreover, the protrusions (13) are rounded so as to provide the driver with a comfortable feeling when the steering wheel is gripped.

Figure 3:
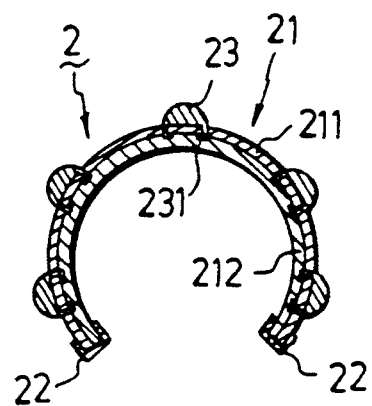
FIG. 3 is a sectional view of the cover according to a second embodiment of this invention.

Referring to FIG. 3, the second embodiment of this invention is shown. The cover (2) includes a tire-shaped cover body (21). Unlike the first embodiment, the tire-shaped cover body (21) is formed of a first cover layer (211) and a second cover layer (212). The outer surface of the second cover layer (212) is adhered to the inner surface of the first cover layer (211). Two engaging rings (22) are substantially U-shaped in cross-section. An annular groove is formed in the outer peripheral wall of each ring (22) so as to engage the rim of the cover body (21). The rings (22) are sewn on the rim of the cover body (21) so as to prevent separation of the first cover layer (211) from the second cover layer (212) and so as to prevent the rim of the cover body (21) from damage. Each of the protrusions (23) is a semicircular bead having a rounded head and two L-shaped legs (231). Each of the legs (231) extends through the first layer (211) and has an end portion clamped between the first and second cover layers (211,212).

Figure 4:
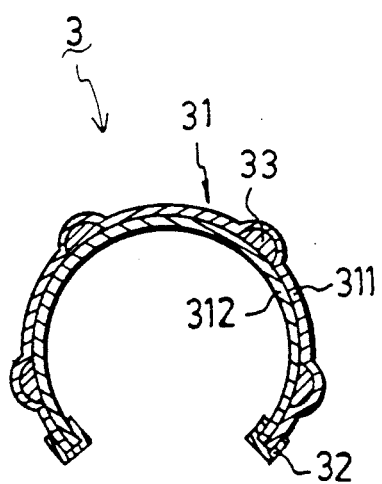
FIG. 4 is a sectional view of the cover according to a third embodiment of this invention.

Referring to FIG. 4, the third embodiment of this invention is shown. The cover (3) includes a tire-shaped cover body (31). The tire-shaped cover body (31) is formed of a first cover layer (311) and a second cover layer (312). The outer surface of the second cover layer (312) is adhered to the inner surface of the first cover layer (311). Two engaging rings (32) are similar to the rings (22) of the second embodiment in structure and function. Unlike the first and second embodiments, each of the protrusions (33) is formed from a semicircular bead having a rounded head. The semicircular beads are interposed between the first cover layer (311) and the second cover layer (312) with the rounded heads abutting against the inner surface of the first cover layer (311) so as to form the protrusions (33).

Figure 6:
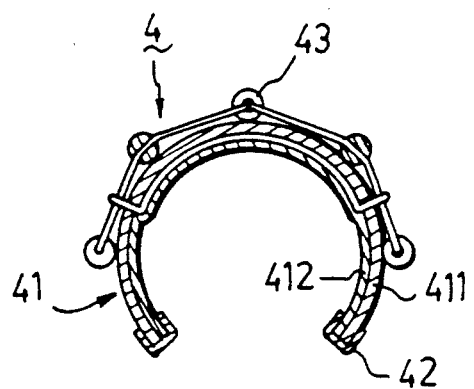
FIG. 6 is a sectional view taken along line VI—VI in FIG. 5.
Figure 5:
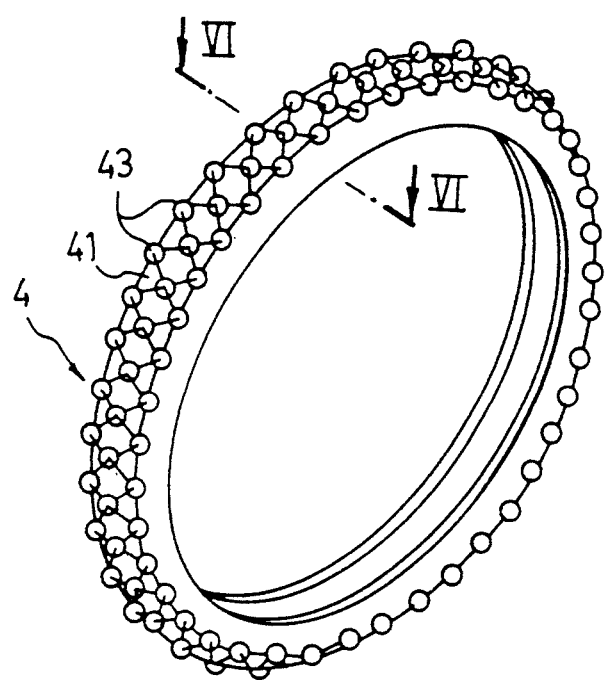
FIG. 5 is a perspective view of the cover according to a fourth embodiment of this invention.

Referring to FIGS. 5 and 6, the fourth embodiment of this invention is shown. The cover (4) includes a tire-shaped cover body (41) which is formed of a first cover layer (411) and a second cover layer (412). The outer surface of the second cover layer (412) is adhered to the inner surface of the first cover layer (411). Two engaging rings (42) (see FIG. 6) are similar to the rings (22,32) (see FIGS. 3 and 4) of the second and third embodiments in structure and function. Unlike the above embodiments, each of the protrusions (43) is a spherical bead sewn on the outer surface of the first cover layer (411) and interconnected with one another.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A cover for a steering wheel of an automobile, including a tire-shaped cover body adapted to be disposed around said steering wheel of said automobile, said cover comprising a plurality of rounded protrusions protruding from the peripheral surface of said tire-shaped body, said tire-shaped cover body being formed of a first cover layer and a second cover layer, each of said first and second cover layers having an outer surface and an inner surface, said outer surface of said second cover layer being adhered to said inner surface of said first cover layer, said protrusions protruding outwardly from said outer surface of said first cover layer, each of said protrusions being a semicircular bead having a rounded head and two L-shaped legs, each of said legs extending through said first layer and having an end portion clamped between said first and second layers.

2. A cover for a steering wheel of an automobile, including a tire-shaped cover body adapted to be disposed around said steering wheel of said automobile, said cover comprising a plurality of rounded protrusions protruding from the peripheral surface of said tire-shaped body, said tire-shaped cover body being formed of a first cover layer and a second cover layer, each of said cover layers having an outer surface and an inner surface, said outer surface of said second cover layer being adhered to said inner surface of said first cover layer, said protrusions protruding outwardly from said outer surface of said first cover layer, each of said protrusions being a semicircular bead having a rounded head, said semicircular bead being interposed between said first cover layer and said second cover layer with said rounded head abutting against said inner surface of said first cover layer.

3. A cover for a steering wheel of an automobile, including a tire-shaped cover body adapted to be disposed around said steering wheel of said automobile, said cover comprising a plurality of rounded protusions protruding from the peripheral surface of said tire-shaped body, said tire-shaped cover body being formed of a first cover layer and a second cover layer, each of said cover layers having an outer surface and an inner surface, said outer surface of said second cover layer being adhered to said inner surface of said first cover layer, said protrusions protruding outwardly from said outer surface of said first cover layer, each of said protrusions being a spherical bead which is sewn securely on said outer surface of said first cover layer.

* * * * *